UNITED STATES PATENT OFFICE.

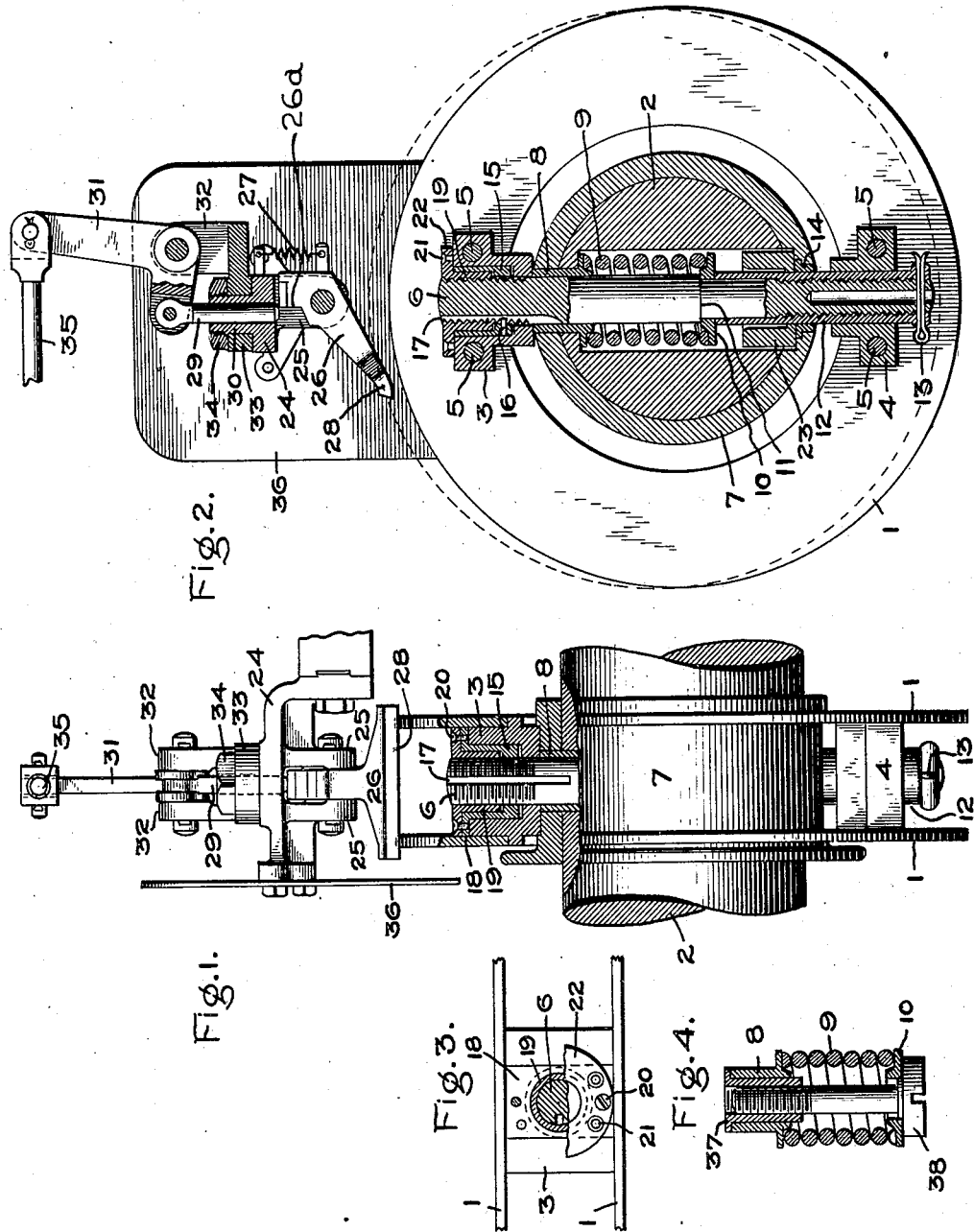
F. W. BENTLEY.
HIGH SPEED EMERGENCY GOVERNOR.
APPLICATION FILED JULY 6, 1910.
1,017,496.  Patented Feb. 13, 1912.
Witnesses:
Inventor:
Fred W. Bentley,
by
His Attorney.

FRED W. BENTLEY, OF SCHENECTADY, NEW YORK, ASSIGNOR TO GENERAL ELECTRIC COMPANY, A CORPORATION OF NEW YORK.

HIGH-SPEED EMERGENCY-GOVERNOR.

1,017,496.  Specification of Letters Patent.  Patented Feb. 13, 1912.

Application filed July 6, 1910. Serial No. 570,560.

*To all whom it may concern:*

Be it known that I, FRED W. BENTLEY, a citizen of the United States, residing at Schenectady, county of Schenectady, State of New York, have invented certain new and useful Improvements in High-Speed Emergency-Governors, of which the following is a specification.

This invention relates to devices for automatically shutting off the supply of steam or other motive energy for steam engines and the like, whenever the speed of rotation of the apparatus exceeds a safe limit.

The object of the invention is to simplify the construction with a view to improved service, better balancing, greater range of adjustability, and security against disturbance of the parts. The type of governor to which these improvements apply is that in which one or more flat rings are mounted concentric with a rotating shaft, but with sufficient play to permit said rings to move diametrically from a normally concentric position to one of eccentricity when the speed of the shaft becomes abnormally high; whereby in their eccentric position said rings are caused to trip mechanism for operating an emergency stop valve in the steam main.

The present invention is an improvement upon the subject-matter of my prior application, Serial No. 486,774, filed March 30, 1909, and is designed for turbines running at 2,000 R. P. M. and over.

In the accompanying drawing, Figure 1 is a side elevation of my improved governor, partly in section; Fig. 2 is an end elevation thereof, partly in section; Fig. 3 is a top view of the rod and its fastening, partly broken away, and Fig. 4 shows the spring temporarily compressed for insertion into its chamber in the shaft.

I employ two flat rings 1 which encircle the shaft 2 at a little distance therefrom. The rings are connected by blocks 3, 4 attached thereto by rivets 5, and arranged at diametrically opposite points. A rod 6 is held in said blocks and extends diametrically through the shaft 2. In order to insure the exact coincidence of the axis of the rod with a diametrical line, the hole in the shaft is drilled somewhat larger than the rod, and a collar or sleeve 7 is slipped over the shaft containing holes for the rod located exactly on a diametrical line. It is far easier to insure accuracy in the drilling of the collar than in drilling the shaft, and this expedient relieves the machinist from the difficulty of locating the hole in the shaft precisely on a diameter thereof.

The hole in the shaft is deeply counterbored, forming a chamber concentric with the rod. A bushing 8 surrounds the rod where it passes through the remainder of the hole in the shaft and that in the collar 7, said bushing having a flange resting against the end of the chamber. A helical spring 9 encircles the rod within the chamber, abutting at one end against the flange of the bushing 8 and at the other against an annular follower 10 concentric with the rod and held firmly against a shoulder 11 thereon by a long sleeve 12 which extends to the outer end of said rod. The sleeve and the rod are preferably screw-threaded, so that by turning the sleeve the follower will be clamped tightly against the shoulder 11. A cotter pin 13 is thrust transversely through registering holes in the sleeve and the rod to lock them together. The collar 7 closes the end of the chamber in the shaft, and the hole in said collar is preferably provided with a bushing 14 in which the sleeve has a sliding and turning fit, as it has also in the block 4.

The block 3 contains a circular socket concentric with the rod, and in said socket is received a cylindrical thimble 15 having a hole in its end fitting the rod 6. A key 16 is carried by the thimble and enters a longitudinal keyway 17 in the upper portion of the rod to keep said rod from angular movement. The thimble is restrained from rotation by a rectangular head or flange 18 fitting a recess in the top of the block 3. It is also counterbored to receive a cylindrical nut 19 which meshes with screw-threads on the rod. By turning said nut, the rod will be shifted lengthwise, and when adjusted it can be held in place by screws 20 which pass through holes 21 in a flange 22 on said nut and enter tapped holes in the head 18. Several such holes are provided to permit a close adjustment of the nut and rod in order to regulate the operating speed.

This governor is designed to be run at high speed, say from 2,000 to 4,000 revolutions per minute. If the spring has any considerable radius of gyration its own weight will close it up completely at this speed. For this reason I have located the spring in the chamber in the shaft and nearly at the axis thereof, extending from one end of the chamber to a little beyond the center of the shaft. In order to balance the eccentricity of the parts and cause the whole mass to run in perfect balance, a weight 23 is placed at the other end of the chamber. This weight is preferably annular, sliding loosely on the sleeve 12. It can be altered in weight to insure perfect balance when running.

The block 3, the thimble 15 and the nut 19 make up a heavier body than the block 4 and sleeve 12, especially as the rod 6 is drilled lengthwise at that end to reduce its weight. The centrifugal forces acting on these two masses at opposite ends of the rod are not balanced, those developed by the block 3 being the greater. At normal speeds, the difference between these two opposite acting forces is counterbalanced by the tension of the spring but when the speed becomes abnormally high, the increase in the otherwise balanced centrifugal force overcomes the spring tension, and the rings, blocks and rod move transversely of the shaft and with accelerated force as the rings depart from their concentric position. The return movement is equally prompt when the speed drops.

A bracket 24 is bolted to a stationary support and projects into the plane of rotation of the rings. Pivoted between a pair of ears 25 depending from said bracket is a tripping lever or arm 26, held yieldingly in a normal position by a light spring 27. The lever has a broad toe 28 spanning the space between the two rings and adapted to be struck by them when they depart from their normal position, as indicated by the dotted line in Fig. 2. A pin 29 rests against a lug on the end of the tripping lever 26 and slides in a hole drilled through a circular neck 30 rising from the bracket, and is pivotally connected to one arm of a bell crank lever 31 fulcrumed in lugs 32 on a swivel 33 rotatable on said neck. A nut 34 clamps the swivel in any position to which it may be turned. The free end of the lever 31 is pivoted to a rod 35 by means of which the valve-closing devices are actuated or released. A shield 36 protects the tripping lever and bell crank from accidental displacement.

The operation is as follows: Under normal conditions the spring keeps the rings in their normal position of concentricity with the shaft. But when the speed of said shaft rises to a dangerous point, the rings shift laterally to a position of eccentricity, as shown in dotted lines in Fig. 2, and very quickly move so far as to strike and lift the toe of the tripping lever. The actuation of this lever trips the pin and permits the bell crank lever to move, thereby effecting, by suitable means, the shutting of the stop valve in the steam main. When the end of the pin moves out of the neck it engages the face 26ª of the lug on the arm 26 and prevents the return of the part 28 to a position where it would be repeatedly struck by the rings as the speed of rotation of the shaft gradually decreases.

The advantages of drilling the holes for the rod in the collar instead of relying upon the hole in the shaft have been already mentioned. Attention has also been called to the better location of the spring close to the axis of the shaft; and to the effect of the changeable weight in counter-balancing the unbalanced portion of the moving parts. It will be observed that the swivel may be rotated so that the rod running from the bell crank lever can be led off in any desired direction.

In assembling the parts, the spring is first put under tension between the bushing 8 and the follower 10 by means of the flanged nut 37 and screw 38, as shown in Fig. 4. Having slipped this and the weight into the chamber of the shaft, the collar is then slid over the shaft and its holes brought in line with said chamber. The screw 38 is then backed out through one of said holes, and the nut is removed through the other; the spring expanding until the follower rests on the weight. The rings are then slid over the collar, until the blocks are in line with the spring chamber. The rod is then thrust in through the block 3, the bushing 8, the spring 9, the follower 10, the weight 23 and the block 4. The sleeve 12 is then screwed upon the rod through the block 4, picking up the follower and forcing it solidly against the shoulder 11 on the rod. The cotter pin 13 is then pushed through the sleeve and the rod to lock them together. The thimble 15 is then dropped into its socket in the block 3, with its key 16 engaging in the keyway 17 in the rod. The nut 19 is then screwed on the rod, and after proper adjustment to regulate the spring tension it is secured by the screws 20 passed through its flange 22. The tension of the spring keeps the block 3 pressed against the collar, in which position the range of play of the rings transverse to the shaft is limited by the normal space between the collar and the block 4. To remove the rings, it is only necessary to pull out the cotter pin, unscrew the sleeve, when the nut and the rod can be pulled out, leaving the rings and blocks loose on the shaft. One advantage of this construction is that when the parts are reassembled, the tension of the spring will be the same as before, if the nut 19 has not been disturbed.

In accordance with the provisions of the patent statutes, I have described the principle of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In an emergency governor, the combination with a shaft having a diametrically located chamber therein, of a rod passing through said chamber, a spring in said chamber acting on said rod, rings surrounding said shaft, blocks connecting said rings and having holes to receive said rod, and means mounted in one of the blocks for moving said rod lengthwise to adjust the tension of said spring.

2. In an emergency governor, the combination with a rotatable shaft having an approximately diametrical hole therethrough, a rod arranged in the hole that is of less diameter than said hole and has its ends projecting beyond the periphery of the shaft, a sleeve mounted on the shaft and having oppositely disposed holes in its walls that are accurately located on a diameter of the shaft and sleeve and in which the ends of the rod are mounted, a ring-shaped member mounted on the rod that surrounds the shaft and has its mass unequally distributed with respect to the axis of the shaft, and a spring that opposes the movement of said member.

3. In an emergency governor, the combination with a shaft, having an approximately diametrical hole therethrough, of a longitudinally movable rod passing through said hole, a collar on said shaft having holes accurately located diametrically opposite and receiving said rod, and rings surrounding said shaft and mounted on said rod.

4. In an emergency governor, the combination with a shaft having a transverse chamber therein, of a rod passing through said chamber, a spring in said chamber acting on said rod, a weight in said chamber disconected from said rod and acting to balance the mass of the spring, and rings surrounding the shaft and mounted on said rod.

5. In an emergency governor, the combination with a shaft having a transverse chamber therein, of a spring in said chamber, a screwthreaded rod passing through said chamber and engaging with said spring, rings surrounding said shaft, blocks connecting said rings and having holes for said rod, and a nut engaging one end of said rod and bearing on one of said blocks, for regulating the tension of said spring.

6. In an emergency governor, the combination with a shaft having a transverse chamber therein, of a spring in said chamber, a screwthreaded rod passing through said chamber, a follower on said rod against which said spring abuts, means for adjusting said rod lengthwise, a sleeve screwed on one end of said rod against said follower, rings surrounding said shaft, and blocks connecting said rings and having holes to receive said rod.

7. In an emergency governor, the combination with a shaft having a transverse chamber, of a spring in said chamber, a screwthreaded rod provided with a keyway and passing through said chamber and engaging with said spring, rings surrounding said shaft, blocks connecting said rings and said shaft, blocks connecting said rings and engaging said rod, one of said blocks having a socket, a counterbored thimble in said socket having a key engaging the keyway in said bolt, a nut engaging said rod and rotatable in the thimble, and means for locking said nut when adjusted.

8. In an emergency governor, the combination with a rotatable shaft having a transverse chamber therein, of a ring-shaped member surrounding the shaft and having its mass unequally distributed with respect to the axis of the shaft, a rod that passes through the chamber and is mounted in the shaft for movement transversely thereof, the ends of the rod being mounted in said member, said rod carrying a collar that is located within the chamber, a spring arranged between the collar and one end of the chamber, means carried by said member for preventing the rotation of the rod while permitting it to move longitudinally, there being a screw-thread on one end of the rod, and a nut for adjusting the rod to vary the tension of the spring that is mounted in the ring-shaped member and engages said thread.

9. In an emergency governor, the combination with a rotatable shaft having a transverse chamber therein, of a sleeve on the shaft that is provided with diametrically opposite holes in its walls that are smaller than the bore of the chamber, a ring-shaped member surrounding the shaft with its mass unequally distributed with respect to the axis of the shaft, a rod that passes through the chamber and is mounted in the shaft and sleeve for movement transversely thereof, the ends of the rod being screw-threaded and projecting beyond the sleeve to receive said member, there being a shoulder on the rod within the chamber, a collar slidably mounted on the rod, a sleeve nut that engages the screw-thread on one end of the rod and holds the collar against the shoulder, the opposite end of the rod being splined, a spring arranged between the collar and one end of the chamber that tends to move the rod longitudinally, a key carried by said member that engages the spline to prevent rotation of the rod while permitting longitudinal movement thereof, and a nut for adjusting the rod longitudinally to vary the action of the spring that is mounted in the ring-shaped member and engages the screw-thread on said opposite end of the rod.

10. In an emergency governing device, the combination of a rotatable shaft, an actuating member mounted thereon, a bracket adjacent said member, a trip arm pivotally mounted on the bracket with one end adjacent said member, a lever also mounted on the bracket, said lever having a tendency to move in a given direction, and a pin slidably mounted in the bracket and pivotally connected at one end to the lever, the other end of the pin normally engaging the trip arm to hold the lever against its tendency to move.

11. In an emergency governing device, the combination of a rotatable shaft, an actuating member mounted thereon, a bracket adjacent said member, a trip arm pivotally mounted on the bracket with the one end adjacent said member, a lever also pivotally mounted on the bracket, said lever having a tendency to move in a given direction, and a pin slidably mounted in the bracket and pivotally connected at one end to the lever, there being a lug on the trip arm one face of which normally engages the other end of the pin to hold the lever against its tendency to move, said lug being moved to release the end of the pin when the trip arm is moved by said member, the pin then preventing the return of the trip arm toward its normal position by engaging another face of the lug.

12. In an emergency governing device, the combination of a rotatable shaft, an actuating member mounted thereon, a bracket adjacent said member that is provided with a neck, a trip arm pivotally mounted on the bracket with one end adjacent said member, a two-armed lever that has a tendency to move in a given direction, a swivel bearing adjustably mounted on the neck, a pivot for the lever that is carried by the bearing, and a pin axially mounted in the neck for sliding movement therein, one end of the pin being pivotally connected to one arm of the lever, the other end of the pin normally engaging the trip arm to hold the lever against its tendency to move.

13. In an emergency governing device, the combination of a rotatable shaft, an actuating member carried thereby, a bracket mounted adjacent said member and provided with a neck having its axis at right angles to the axis of the shaft, a trip arm pivotally mounted on the bracket with the axis of its pivot parallel to the axis of the shaft, one end of the arm being arranged adjacent said member, a swivel bearing rotatably mounted on the neck, means for securing the bearing in adjusted position on said neck, a bell crank lever that has a tendency to move in a given direction, a pivot for the lever carried by the bearing, the axis of the pivot being parallel to the axis of the shaft, and a pin axially mounted in the neck for sliding movement therein, one end of the pin being pivotally connected to the end of one arm of the bell crank lever, and the bell crank lever being normally held against its tendency to move by the engagement of the other end of the pin with the trip arm.

In witness whereof, I have hereunto set my hand this 2nd day of July, 1910.

FRED W. BENTLEY.

Witnesses:
HELEN ORFORD,
BENJAMIN B. HULL.